Figure 1:
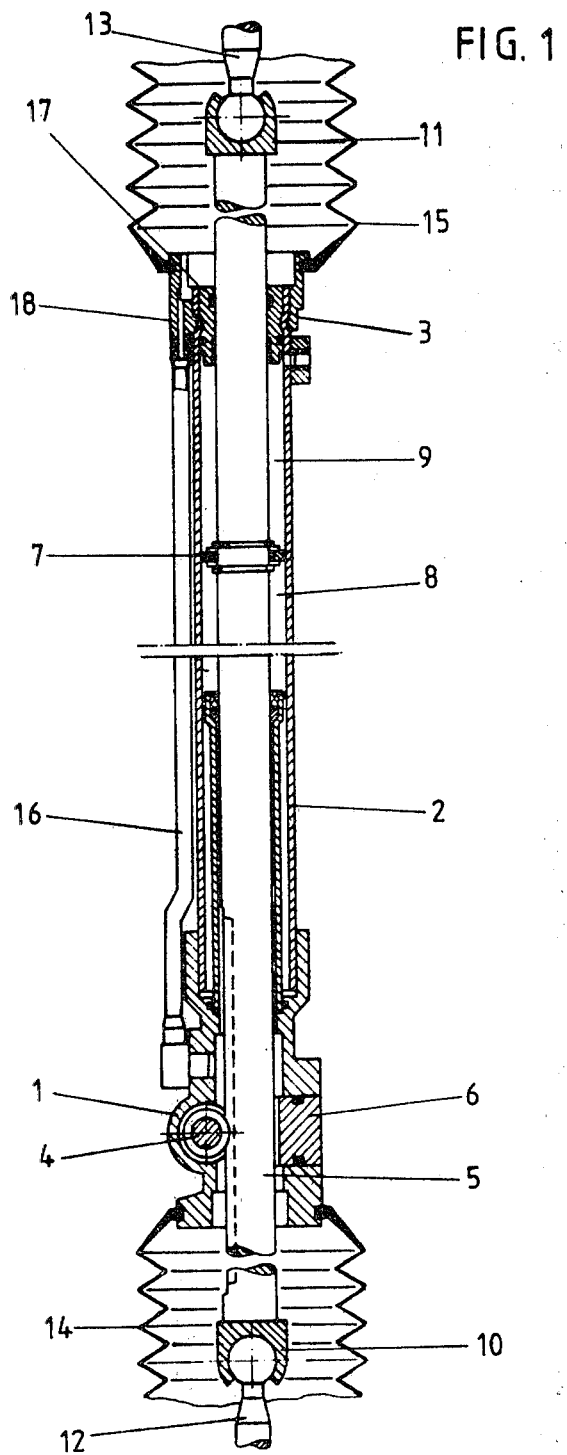

United States Patent [19]

Walter

[11] 4,301,691

[45] Nov. 24, 1981

[54] RACK STEERING MECHANISM

[75] Inventor: Wolfgang Walter, Schwabisch Gmund, Fed. Rep. of Germany

[73] Assignee: Zahnradfabrik Friedrichshafen, AG., Friedrichshafen, Fed. Rep. of Germany

[21] Appl. No.: 99,807

[22] Filed: Dec. 3, 1979

[30] Foreign Application Priority Data

Dec. 1, 1978 [DE] Fed. Rep. of Germany ....... 2852021

[51] Int. Cl.³ .............................................. F16H 1/04
[52] U.S. Cl. ..................................... 74/422; 180/148; 403/50
[58] Field of Search ...................... 74/422; 403/50, 51; 180/148; 280/96

[56] References Cited

U.S. PATENT DOCUMENTS 3,762,740 10/1973 Cass ......................................... 280/96
3,927,576 12/1975 Colletti ............................. 74/422 X

FOREIGN PATENT DOCUMENTS 882510 11/1961 United Kingdom .................. 74/422
1219471 1/1971 United Kingdom .................. 74/422

Primary Examiner—C. J. Husar
Assistant Examiner—Conrad Berman
Attorney, Agent, or Firm—Zalkind & Shuster

[57] ABSTRACT

An enclosure means for a cylinder end of a rack steering mechanism is provided comprising a bearing within the cylinder end for slidably supporting a rack and which is secured to the cylinder by nesting corrugations of the cylinder and the bearing coacting to lock the cylinder and bearing together. A sleeve of synthetic material surrounds the cylinder end and has an inwardly directed radial corrugation nesting within the corrugation of the cylinder locking it to the cylinder. The sleeve is provided with a ported through passage for equalizing air to be transferred between respective bellows at the ends of the rack which protect ball joints connecting the rack to a steering mechanism.

9 Claims, 2 Drawing Figures

RACK STEERING MECHANISM

This invention relates to an application filed by Wolfgang Walter, Oct. 30, 1979, Ser. No. 089,481, assigned to the same assignee as this application.

In general, rack steering mechanisms have a strong return, direct gear ratio, and in particular require a minimum of space and components for connections to steering linkages, all in a flat or compact arrangement.

The invention herein utilizes generally conventional pinion drive and toothed rack components with support bearings within the cylinder through which the rack reciprocates. At the cylinder end opposite the pinion drive end a particular closure means with a bearing is locked or secured to the cylinder without the use of threaded sleeves or nuts in accordance with the invention.

Thus, in conventional constructions, closure means for the cylinder end opposite the pinion drive end generally consist of a rack bearing with a connecting bore for an air equalization line that connects the protective boots or bellows surrounding ball joint connections at respective ends of the rack. In particular, end closure members are fastened in conventional constructions to cylinder ends with a nut against a ring which is sprung so as to be loosely carried in a groove in the surface of the cylinder and serving as a back stop for tightening of a securing nut. It has been found that such constructions are expensive and require numerous parts needing expensive machining, thus increasing manufacturing and assembly costs. Further, in operation, there is danger that vibration, shock, or the like, could cause the ring to be dislodged and render the steering mechanism defective.

The present invention overcomes drawbacks of the prior art by providing a construction which is operationally safer and more cost effective.

The advantage of the invention is achieved by providing an end closure means which comprises a bearing inside the cylinder at on end for slidable support of a rack, and an outer sleeve having a ported through passage to pass air, encompassing the cylinder at that end. Particularly novel coaction is effected by providing peripheral corrugations all essentially in the same plane, i.e., radially alined or concentric for the bearing, the cylinder and the sleeve, so that they nest into each other and form a single locked integral construction.

Thus, by making the end closure means as two members, namely, a bearing and a sleeve, the functions required are readily achieved in a simple and economical manner as compared with the prior art.

In the assembly of the elements of the invention, the bearing may be inserted into the cylinder and the cylinder, being of ductile metal, then peripherally indented or corrugated with a radially inwardly directed corrugation into a groove or corrugation of the bearing. This can be done by means of a crimping tool fully around the circumference or in segments around the circumference in various known ways. Such connection is secure, safe and simple to effect.

The sleeve is preferably of a resilient material, for example, synthetic plastic, and is formed with a radially inwardly directed corrugation, ridge, or protuberance, that nests into the concavity of the corrugation that locks the cylinder to the bearing. Inasmuch as the sleeve is resilient, the corrugation can be simply snapped into place by sliding the sleeve over the cylinder end. Since there is no great stress on the sleeve, no special materials are required other than sufficient resiliency, and the sleeve may be made by the usual molding processes for plastics whereby passages are provided therethrough and no cutting or machining is required.

Advantageously, the bearing is made of cast iron and accordingly no special bearing metal inserts are necessary.

Figure 2:
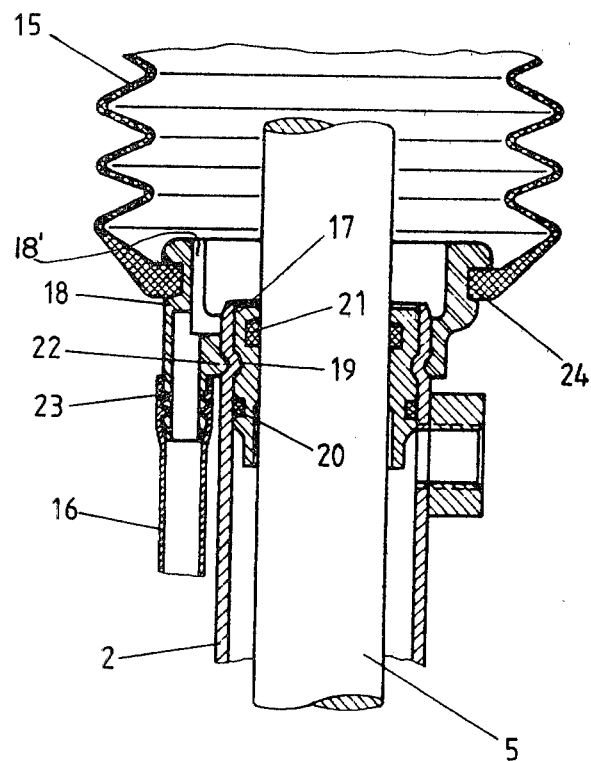

A detailed description of the invention now follows in conjunction with the appended drawing in which:

FIG. 1 is a longitudinal section through a rack steering mechanism of the invention, and FIG. 2 is an enlarged fragmentary illustration of the end of the cylinder showing the particular components and assembly thereof of the invention, in cross section.

Referring to the drawing, it will be noted that the overall arrangement comprises a conventional rack steering mechanism having the pinion housing 1, carried at one end of a pressure cylinder 2, wherein the opposite end of the cylinder is closed by end means which serves as a rack support in a manner to be described. The pinion housing 1 contains pinion 4 meshing with the coacting teeth, in the usual manner, of a rack 5 reciprocally supported between the pinion housing 1 and the end closure means 3. The usual radial support member 6 is provided in the pinion housing, as shown. Rack 5 carries the usual piston 7 between pressure chambers 8 and 9 and is conventionally connected at respective ends with tie rod connections such as ball joints 10 and 11 and respective tie rods 12 and 13, all as heretofore known.

The ball joint connections are protected against dirt and debris, etc., by respective boots or belows 14 and 15 connecting with each other via an air equalization tube 16, all of which is conventional.

Closure means 3 comprises an inner bearing 17, preferably of cast iron, which is locked within cylinder 2 and a sleeve 18 of resilient material locked exteriorily on cylinder 2. The bearing 17 is provided with a groove or peripheral corrugation 19 effecting a concavity into which is pressed the inwardly radially directed corrugation at that end of cylinder 2 after the bearing is placed in the cylinder end. Thus these corrugations nest to firmly secure the members together.

An outer seal 20 on the bearing 17 seals the bearing within cylinder 2 and an inner seal 21 seals the bearing on rack 5 against pressure in chamber 9.

It will be apparent that inasmuch as the cylinder 2 is made of a ductile, relatively thin metal, it may be crimped with the corrugation shown so as to lock to the bearing within the corrugation 19 after the bearing has been set in the proper position within the end of the cylinder.

The sleeve 18, which effects an air passage connection between bellows 15 and air equalization tube 16 via slot 18' may be molded of resilient synthetic material with the inwardly radially directed corrugation 22 effecting a protubernace that nests in the concave side of the corrugation in cylinder 2. Accordingly, a coacting series of concentric locking corrugations essentially is effected, and the sleeve 18 may be simply slid into place on pipe 2, having enough radial stretch so that the sleeve corrugation 22 convexity will snap into the concavity of the corrugation in cylinder 2, as will readily be perceived. Since sleeve 18 carries no strain but is merely for the purpose of providing a ported passage having a connecting branch 23, between bellows 15 and tube 16, no assembly problems are encountered, and the entire construction is readily and economically manufactured.

What is claimed is:

1. In a rack steering mechanism of the kind having a cylinder with a reciprocal rack passing therethrough and steering connections at respective ends of said rack with protective bellows encompassing respective steering connections and including a cylinder closure means and rack drive means at one end of said cylinder and a cylinder closure means at the opposite end of said cylinder slidably supporting said rack and further including an air equalization tube connecting said bellows;

the improvement wherein:
said latter cylinder closure means (3) comprises a bearing (17) encompassing said rack (5) for reciprocal guidance and support;
said bearing and cylinder having respective peripheral corrugations in nesting coaction to secure said bearing to said cylinder;
a sleeve (18) encompassing said cylinder and having a corrugation (22) nesting with the corrugation of said cylinder to be secured thereto;
said sleeve having a through passage and means for connecting a protective bellows and an air equalization tube to said sleeve for air passage there between.

2. In a mechanism as set forth in claim 1, wherein said bearing is of cast iron material.

3. In a mechanism as set forth in claim 1, wherein said sleeve is of resilient material and comprises a peripheral groove to accommodate and secure an open end of a bellows and further comprises a ported passageway for connection to an air equalization tube to communicate with the interior of a bellows secured to said sleeve.

4. In a mechanism as set forth in claim 3, wherein said sleeve is of a synthetic plastic material.

5. In a mechanism as set forth in claim 3, wherein said bearing is of cast iron material.

6. In a rack steering mechanism, a closure means for a steering rack cylinder comprising, in combination, a cylinder, a bearing within said cylinder, means securing said bearing within said cylinder comprising nesting indentation means of said cylinder and said bearing locking said bearing to said cylinder;

a sleeve surrounding said cylinder having protuberance means nesting with the indentation means of said cylinder to lock said sleeve thereto;
said sleeve having a passage whereby air may be transmitted through said sleeve.

7. The combination of claim 6, including an inner seal (21) within said bearing for sealing a rack therein and an outer seal (20) on said bearing for sealing said bearing in said cylinder.

8. The combination of claim 6, said sleeve being of resilient material and said protuberance means having a convexity;

said cylinder indentation means having a convexity at one side and a concavity at the other side; said bearing indentation means having a concavity.

9. The combination of claim 6, said indentation means of said cylinder and said bearing and said protuberance means of said sleeve being in concentric locked array.

* * * * *